Sept. 18, 1923.

R. P. THOMPSON 1,468,410

GEARING FOR DRIVE WHEELS

Filed Oct. 16, 1920

INVENTOR
Ralph P. Thompson,
BY
Toulmin & Toulmin
ATTORNEYS

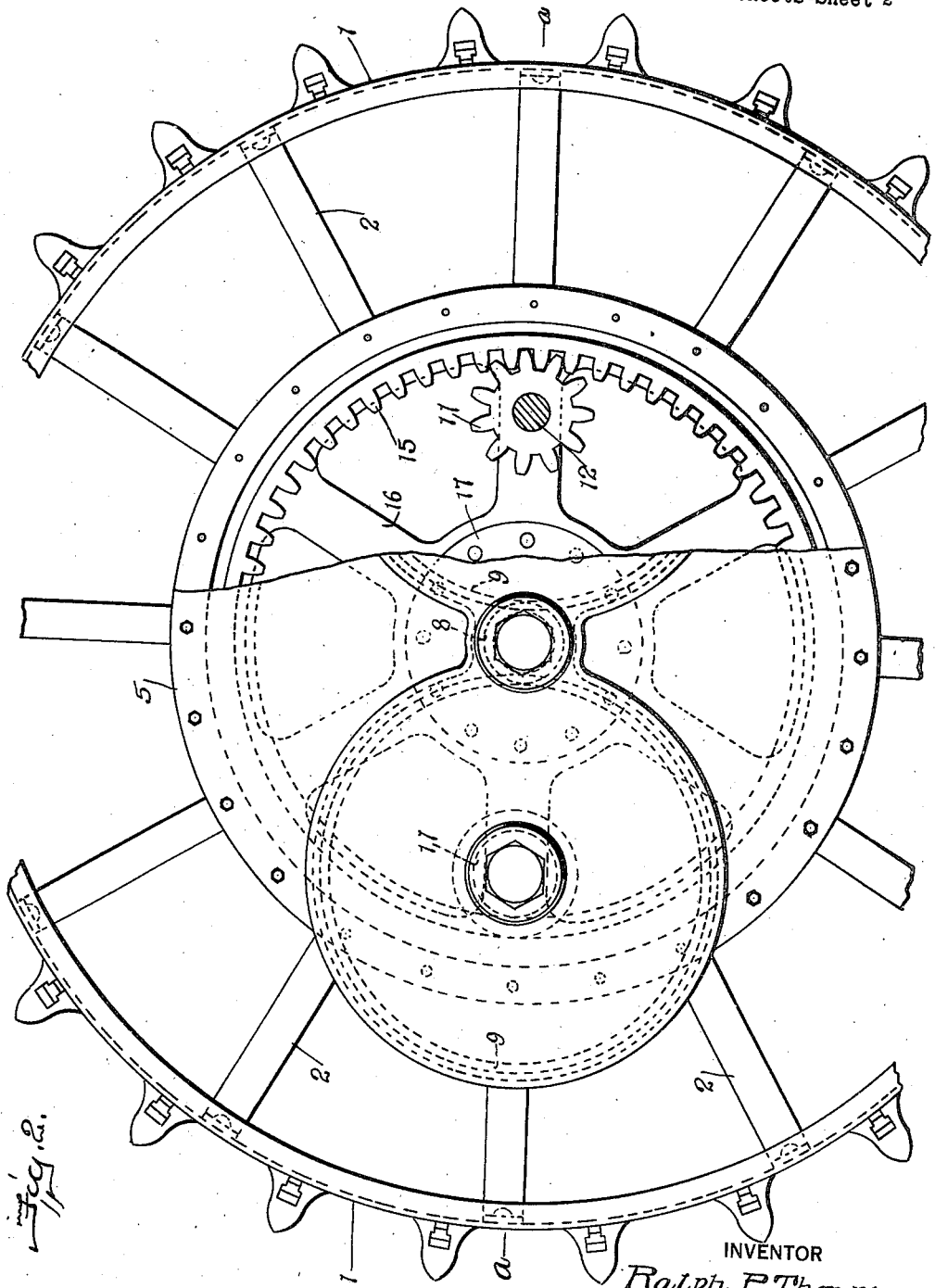

Patented Sept. 18, 1923.

1,468,410

UNITED STATES PATENT OFFICE.

RALPH P. THOMPSON, OF WESTOVER, MARYLAND.

GEARING FOR DRIVE WHEELS.

Application filed October 16, 1920. Serial No. 417,343.

*To all whom it may concern:*

Be it known that I, RALPH P. THOMPSON, a citizen of the United States, residing at Westover, in the county of Somerset and State of Maryland, have invented certain new and useful Improvements in Gearing for Drive Wheels, of which the following is a specification, reference being had therein to the accompanying drawing.

My invention relates to automotive equipment and in particular to gearing for a drive wheel.

The particular adaptation illustrated in my application is that of a tractor wheel. The object of my invention is to effect a reduction in speed and to effect the transmission of power of the motor to the drive wheels. It is my object to provide a speed reducing mechanism for a tractor drive of such character as to continually run in oil or other lubricant, to be thoroughly and completely enclosed so as to be dust proof, water proof and otherwise impervious to foreign substances.

It is well known that tractors, and in particular the wheel portion of the tractor, must operate under conditions where very fine dust, mud and water are common and constant.

The object of my invention is to secure rigidity of construction, long life of the wearing parts and at the same time to secure that lightness of construction which is essential to a proper design of a tractor wheel.

It is my object to avoid the spring or give common in tractor wheels where a ring gear is carried by the wheel and this gear is acted upon by a pinion with its shaft journaled in the frame of the tractor. The objection to this type of construction has been that it seriously affects the alinement of gears and consequently causes them to wear out prematurely.

My invention secures the long life of the gears by having sufficient contact between the teeth of the gears. I accomplish this important object by employing a multiplicity of gears in the final drive so that the aggregate length of tooth contact is far greater than could be obtained were single gear used.

Another object of my invention is to secure durability through sufficient rigidity of structure to prevent any distortion of the journal bearings that would affect the center distances or the alinement of gears. It will be observed that I accomplish this object by using a multiplicity of gears in the final drive so that the load is divided and therefore correspondingly less on each gear journal. It will also be observed that these gear journals are carried by a single casting that can be made readily in sufficient strength to prevent any give or spring in the structure.

I have enclosed the whole mechanism of the drive wheel in the hub. As the parts revolve the oil contained in the bottom of the gear case is splashed over all of the parts and forms a perfect system of lubrication. The oil film within the case serves to completely seal any small orifices that might exist in a joint in the parts of the casing so that all fine particles, such as dust, etc. are excluded. This is especially important as in far western States where the fine alkali dust or lava dust penetrates nearly every structure.

Referring to the drawings:

Fig. 2, is a side elevation of the wheel with a portion of the casing broken away to show the gearing, the remainder of the gearing being shown by dotted lines.

Figure 1:
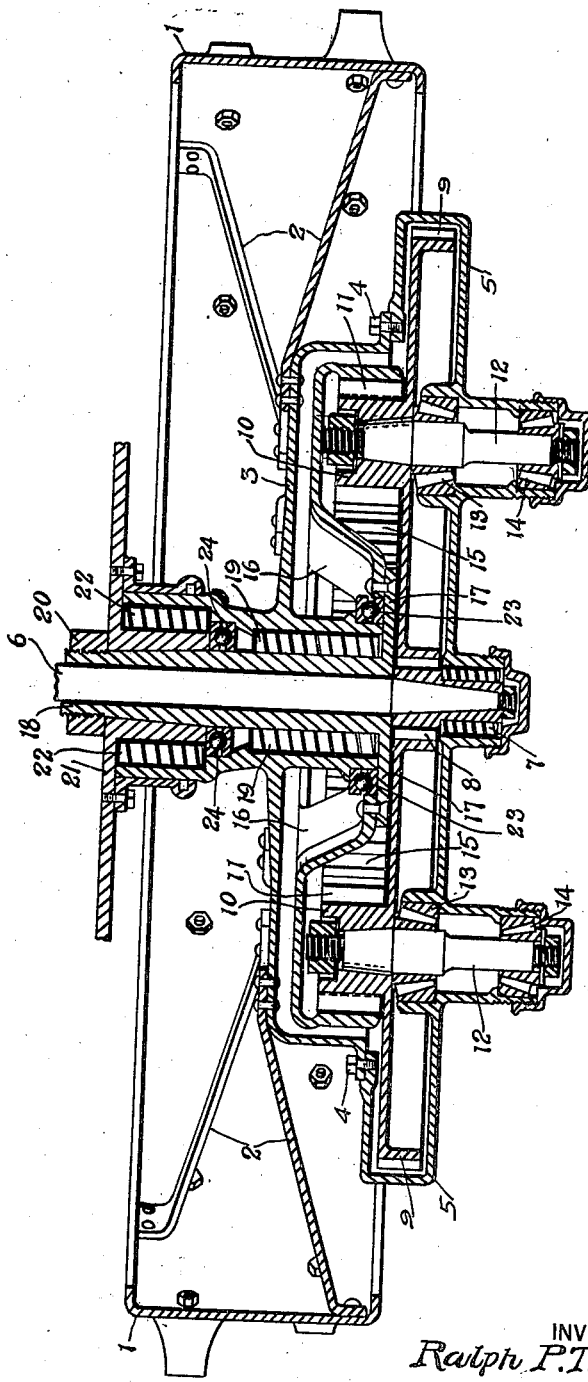
Fig. 1, is a section on the line $a$—$a$ of Figure 2.

Referring to Figure 1, 1 is the tread of a wheel of a tractor. 2—2 are braces or spokes of the wheel riveted to a hub casing 3. Gear casing 5 is attached by screws to hub casing 3 at 4.

The axle 6 is supported at one end in a bearing, not shown, and its other end in a bearing 7. This axle has mounted on one end the pinion 8 which meshes with the gear 9. The gear 9 has a hub 10 upon which is mounted a pinion 11. This pinion 11 and the gear 9 are journaled on a stub shaft 12 supported in bearings 13 and 14. The bearings 13 and 14 are carried in the housing 5. The pinion 11 meshes with an internal gear 15. This gear is supported by a spider 16, mounted upon a flange 17 of a long bearing member 18. Between the housing or hub 3 and 18 are annular bearings 19. This member 18 is fastened by the nut 20 to the frame member 21. Between the frame member 21 and the hub 3 is an annular bearing 22. A ball bearing 23 is interposed between the hub 3 and the extension 17. Ball bearings 24 are located between the hub and the members 18 and 21 for a similar purpose of taking up the thrust.

Method of operation.

The method of operation of this wheel consists of driving the shaft 6, which carries with it the gear 8. This gear in turn rotates a pair of gears designated as 9. This results in rotating the pinions 11 which roll around within the internal gear 15 supported by the spider 16. This internal gear and its spider are stationary and they are positively connected through 17 and 18 with the frame 21. The housing 5 in which is mounted the stub shafts 12 is an integral part of the wheel and turns with it so that the casing 5, together with the hub casing 3 travel with the wheel as a unit, carrying with them the gears 11 and 9. The oil in this casing serves to lubricate all of the gears and the bearings. Thus I am enabled to transmit the power through the axle 6 to the wheel 1 slowly and effectively with the least strain on the parts, due to the multiplicity of teeth always in engagement. This provides a large tooth surface.

Having thus fully described my invention, what I claim as new and desire to secure by Letters Patent, is:—

1. In a speed reducing mechanism a frame, a non-rotatable hub having a flange at one end and a nut for clamping it to said frame at the other end thereon, a tractor wheel journaled on the inner part of the hub between the flange and frame, a driving gear, a stationary gear of large diameter having a spider integral therewith, and bolted to said flange, each of said gears having as its common axis, the axis of a tractor wheel, journal bearings carried by the tractor wheel adapted to support planetary gears, said gears being adapted to mesh with said driving gear and said stationary gear whereby the planetary gears revolve about the axis of the tractor wheel to actuate said wheel.

2. A wheel propelling means including a drive axle, a non-rotatable hub, a casing journaled on the hub, a traction wheel having spokes with their inner ends attached to and terminating on the perimeter of said casing, a stationary gear within the casing bolted to the end of said stationary hub and planetary gears within said casing and coacting with said drive axle and said stationary gear in propelling the wheel.

3. In a wheel propelling mechanism a frame, a non-rotatable hub having a flange at one end and a nut to hold it to the frame at the other end, a dust-proof casing journaled on said hub, planetary gears journaled in said casing, each gear having a double bearing in said casing with an oil space between said bearings and a stationary gear having spider arms bolted to said hub and with which the planetary gearings coact in propelling the wheel.

4. In a wheel propelling mechanism a frame, a non-rotatable hub having a flange at one end and a nut to hold it to the frame at the other end, a dust-proof casing journaled on said hub, planetary gears journaled in said casing, a drive shaft extended through said hub and having at its end a bearing for said casing, and a stationary gear surrounding said flange and having an integral spider bolted to the flange and with which gear the planetary gears coact in propelling the wheel.

In testimony whereof, I affix my signature.

RALPH P. THOMPSON.